United States Patent Office 3,101,182
Patented Aug. 20, 1963

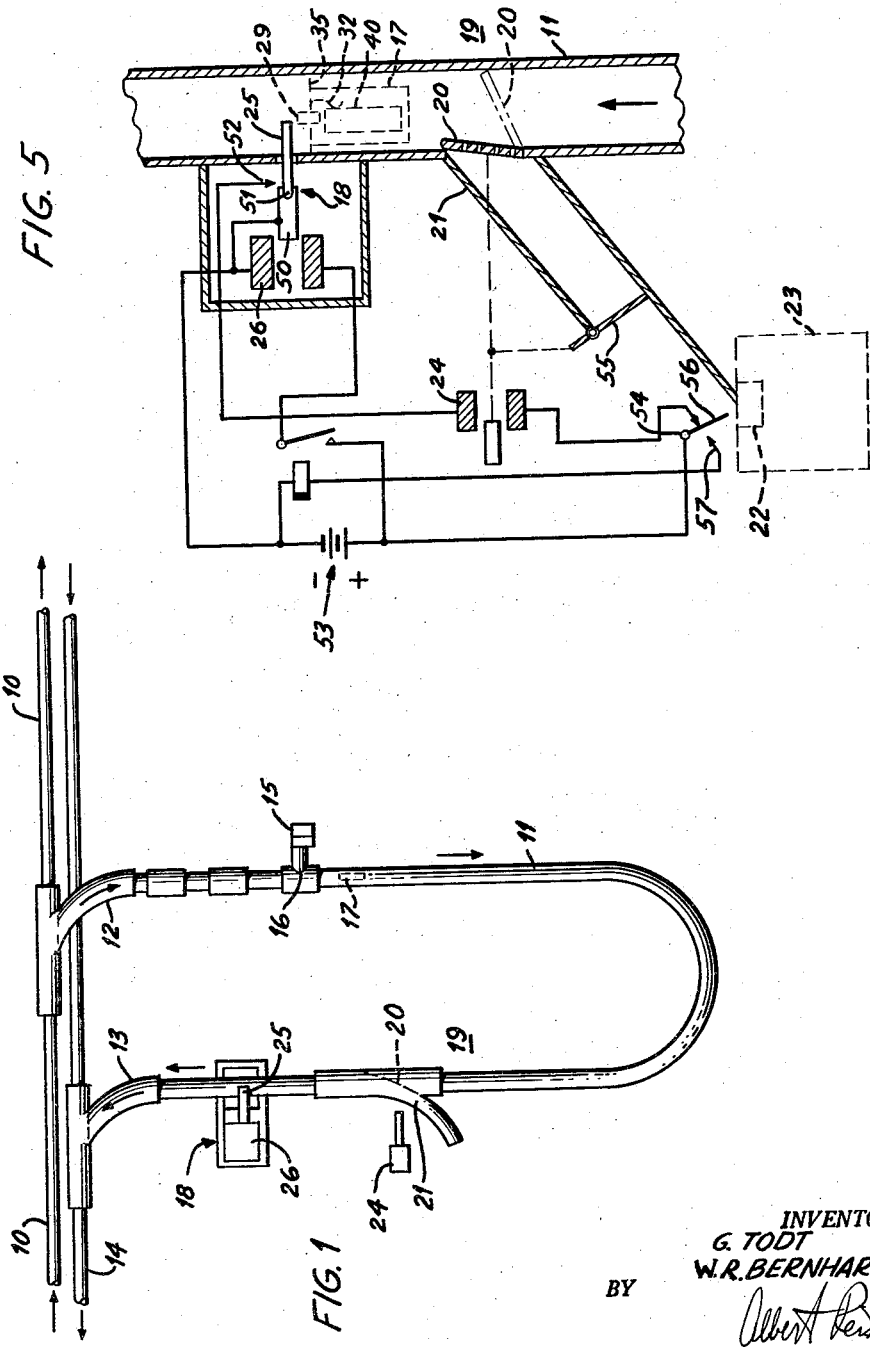

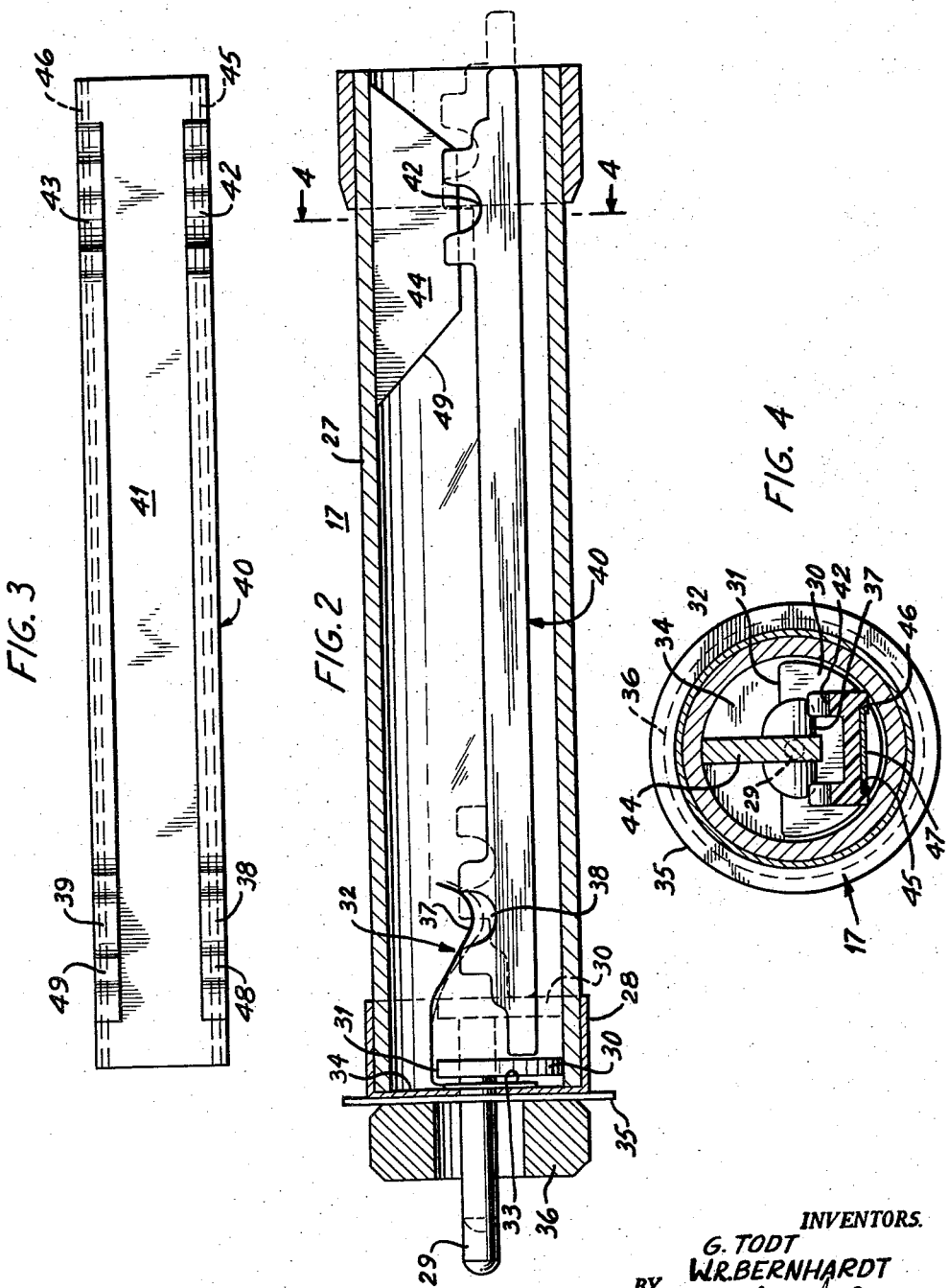

3,101,182
AUTOMATIC EJECTOR FOR PNEUMATIC TUBE SYSTEMS
Gerhard Todt, Cliffside Park, N.J., and William R. Bernhardt, Long Island City, N.Y., assignors to Airmatic Systems Corporation, Rochelle Park, N.J., a corporation of Delaware
Filed Apr. 13, 1960, Ser. No. 22,053
12 Claims. (Cl. 243—1)

This invention relates to pneumatic tube transport systems, and more especially it relates to automatic ejection controls for such systems.

In certain kinds of pneumatic transport systems it is desirable to be able to eject the subject matter from the transporting carrier to a receiving hopper or table, without removing the entire carrier from the pneumatic system. Thus one particular field of application to which the invention is specially suited is in the transmission of flight information from a central station to a flight board attendant at a receiving station. In order to avoid the necessity of the flight board attendant having to insert and remove a complete carrier each time flight information is received, the present invention provides a novel arrangement whereby the carrier is automatically stopped at the receiving point and in doing so it automatically ejects the flight information strip or other subject matter which has been conveyed by the carrier.

A feature of the invention relates to a novel construction of carrier for pneumatic tube transport systems, which enables information to be transmitted via pneumatic tube carriers without the necessity of an attendant at a receiving point, removing and inserting the entire carrier after the information has been obtained therefrom.

Another feature relates to a novel pneumatic tube carrier which is adapted to receive and releasably lock therein a member carrying informational subject matter such, for example, as flight information strips, and which member is automatically ejected from the carrier without removal of the carrier from the pneumatic tube system.

Another feature relates to a pneumatic tube carrier which is provided with automatic ejection means rendered effective to eject the contents of the carrier when the latter arrives at a selected receiving point, but without the removal of the carrier as a whole, thus permitting the carrier to be automatically returned to the central point after it has ejected its contents and without removal from the pneumatic tube system.

A further feature relates to a novel automatic ejection control arrangement for pneumatic tube systems, whereby information can be transported by a carrier from a central point to a plurality of selectable receiving points without removal of the carrier from the system at the receiving point.

A still further feature relates to a novel carrier and information holder which can be readily inserted and locked in a conventional pneumatic tube carrier and which can be readily released from the carrier automatically.

Other features and advantages will appear from the ensuing descriptions, the appended claims and the attached drawings.

In the drawing:
FIG. 1 is a schematic diagram of part of a pneumatic tube system embodying the invention;
FIG. 2 is a longitudinal cross-sectional view of a carrier according to the invention, with a releasable insert;
FIG. 3 is a plan view of the releasable insert that is used with the carrier of FIG. 2;
FIG. 4 is a section of FIG. 2 taken along the line 4—4 thereof;

FIG. 5 is a schematic structure and wiring diagram of the stopping and ejection control portions of the system according to the invention.

Referring to FIG. 1, there is shown part of a typical pneumatic tube system embodying the invention. The main distributing line 10 leads from a central station to a plurality of local receiving lines or loops 11. Merely for simplicity in the drawing, only one such loop is shown. The direction of travel of the carriers through the pneumatic tubes is indicated by the arrows. Each receiving loop is connected to the distributing loop 10 by a directional switch 12 of any well known construction, whereby the carrier intended for the particular loop shown in the drawing, is diverted from the main distributing line 10 into the receiving loop 11. For a detailed description of such a switch, reference may be had to U.S. Patent No. 2,698,722.

Likewise each receiving loop is connected by a Y-branch 13 to the common return or collecting line 14 leading to the central station. When the carrier with its contents passes through switch 12 it operates a contact (not shown) which closes an electric circuit through the solenoid 15 of a normally closed wind gate 16, and thus allows air to enter the receiving loop, causing the transportation of the carrier 17 to the carrier stop and ejection control unit 18. Just before reaching the unit 18 the carrier passes a diverting switch 19 which has a swingable tongue 20. The tongue in one position closes off the exit chute 21 and in the other position it opens the entrance to the exit chute 21. In the normal position, the tongue 20, as indicated in FIG. 5, is in the full line position where it closes off the exit chute 21 leading to a receiving receptacle 22 in any well known form of control console 23. Immediately after the carrier 17 passes the switch 19, the tongue 20 moves to the dotted line position. The tongue 20 may be controlled by a solenoid 24, as will be described hereinbelow in connection with FIG. 5. Shortly after passing the switch 19, the carrier 17 abuts against a controllable stop 25 which is controlled by a suitable solenoid 26. When the carrier strikes stop 25 it actuates the ejection device in the carrier causing the information strip inside the carrier to be ejected and to fall, partly by gravity and partly as a result of the ejection means, downwardly into the chute 21. During this interval, after the carrier has been stopped by member 25, the carrier stays in its stopped position and simultaneously seals the tubing against air loss by means of the usual felt head at the forward end of the carrier. The pressure in the loop behind the carrier is discharged because wind gate 16 is open, and since at this time solenoid 24 is energized, the tongue 20 is moved to its chute-opening position as indicated in dotted lines in FIG. 5. The insert within the carrier then slides downwardly through the chute 21 into the receptacle 22. As soon as the information insert has cleared the system, the carrier is released by operation of the solenoid 26 and it is automatically returned via the Y-branch 13 to the central sounding station.

Referring more particularly to FIGS. 2, 3 and 4 of the drawing, the carrier 17 comprises an elongated cylindrical casing 27 preferably, although not necessarily, of clear plastic. Attached to the forward end of the casing 27 is a metal cup 28 having a central opening through which passes a metal ejector pin 29. Attached to the inner end of pin 29 is a metal plate 30 having a flat 31 at one side to engage a leaf spring 32 having a bent back portion 33 which is suitably fastened to the wall 34 of cup 28. The spring 32 has an opening to permit the free passage of the pin 29. Suitably attached by screws to the outer face of wall 34 is the usual air washer 35 which rubs against the inner wall of the pneumatic tubing through which the carrier is transported. Also fastened to the cup 28 is the usual felt head 36.

The spring 32 has a bowed portion 37 which is adapted to register with the notches 38, 39 in the side walls of the releasable insert member 40. The spring 37 in its normal position is biased to the dotted line position, and when member 40 is inserted into the carrier the bowed portion 37 presses against the edges of the notches 38, 39, thus locking the insert member 40 in place within the casing 27. As shown more clearly in FIG. 3, the member 40 is preferably molded from plastic to form an elongated channel 41 with the notches 38, 39 at the forward end of the member 40 and with a similar pair of notches 42, 43 at the opposite end of member 40. In other words, the notches are symmetrically located with respect to the ends of member 40 so that the said member 40 can be inserted into the casing 27 in either direction. In order to insure that the member 40 is inserted so that the notches 38, 39 or the notches 42, 43, as the case may be, register with the bowed portion 37 of spring 32, the inner wall of casing 27 may be provided with an integral rib 44 which extends radially beyond the center longitudinal axis of casing 27. Thus, the member 40 cannot be inserted into the carrier 17 in any other relation except with the notches in the member 40 in registry with the spring bow 37. When the insert 40 is to be used to carry information strips in the form of cardboard, plastic or metal strips carrying written or printed information, if desired the bottom face of member 40 can be undercut to provide oppositely disposed V-shaped longitudinal notches 45, 46 into which the information strip 47 can be inserted. It will be understood, of course, that the invention is not limited to any particular conformation of the insert, so long as it carries the symmetric notches at opposite ends by means of which it may be locked in the carrier by means of the bowed spring 32.

Since the spring 37 in its normal position is biased over the center of the carrier, as indicated in the dotted line position of FIG. 2, it prevents the releasing pin 29 from falling out of place. In other words, when there is no insert member 40 in the carrier, the pin 29 is held in its downward position, indicated by the dotted lines in FIG. 2, by the pressure of the spring 37 on the flat 31. When the insert 40 is to be locked into the carrier, it is inserted through the lower open end of the carrier 17 and pushed until the forward end of member 40 engages the plate 30 to push the latter from its dotted line position shown in FIG. 2 to its full line position as shown. In that relation of the parts, the bowed portion 37 of the spring 32 snaps into the notches 38 and 39 and positively locks the insert against dislodgment. When it is desired to eject the insert with its information strip, the pin 29 strikes a suitable abutment which forces it to the dotted line position so that the edges 48 and 49 of the notch act to cam the spring 32 towards the right so that the bowed portion 37 is out of locking registry with the notches 38 and 39. The insert 40 can then drop by gravity into any suitable receptacle. It should be observed that during the initial dropping movement of the insert 40, the spring 32, as it rides over the surface of the notch edges 48, 49 acts, by reason of its bias, to give an additional ejection force to the insert to insure that it is ejected from the carrier.

FIG. 5 shows in schematic form one typical arrangement of circuits and controls that may be used to eject the insert with its information strip from the carrier. In FIG. 5 the parts corresponding to those of the preceding figures bear the same designation numerals. When the carrier 17 arrives in the direction of the arrow through the loop receiving line 11, as above described, the pin 29 strikes a stop 25 which may be attached to the armature 50 of the solenoid 26. Normally, the solenoid 26 is deenergized so that the stop 25 is in the path of the arriving carrier 17. When the pin 29 strikes the stop 25, the latter is subject to an initial slight pivoting movement around the pivot 51, causing it to engage the contact 52, so as to close a circuit from the negative terminal of a suitable direct current source 53, thence through the member 25, contact 52, winding of solenoid 24, through the normally closed contacts of switch 54, and thence to the positive terminal of the source 53. However, as soon as the solenoid 24 is energized, it causes the tongue 20 to be moved to the dotted line position so as to open the entrance to the chute 21. While the solenoid 24 is energized, the pin 29 abuts against the stop 25 with sufficient force to cause the insert 40 to be ejected from the carrier 17 and to fall down through the chute 21 into the receptacle 22. At the same time that tongue 20 is moved to its dotted line position the armature solenoid 24 operates the closure flap 55 to open the exit end of the chute and allow the insert to proceed toward the receptacle 22. As the insert falls down the chute, it strikes the switch arm 56 causing that switch arm to engage the contact 57 and close a circuit from the source 53 through a slow release relay 53a. Relay 53a normally opens contacts 53b and 53c which then close completing an operating circuit through the winding of solenoid 26. The solenoid attracts its armature 50 and releases the stop 25 from engagement with the pin 29, thus allowing the carrier 17 to proceed through the pneumatic tube 11 in the direction of the arrow. It should be observed that just before solenoid 26 operates to release the stop 25, the above described circuit through solenoid 24 is broken at contact 54 and the tongue 20 is restored to its full line position. After the carrier 17 passes the stop 25, the latter breaks engagement with contact 52, thus opening the circuit of solenoid 25. The slow release relay will keep the solenoid 26 operated long enough for the carrier 17 to clear the stop 25 before it is re-inserted into the tube 11.

It will be understood, of course, that the invention is not limited to the particular circuit or manner of controlling the stop 25 and the tongue 20 as described, and various other arrangements may be used to control those elements in the proper timed relation.

What is claimed is:

1. In a pneumatic tube transport system, the combination of a pneumatic tube leading to a receiving station, at least one carrier arranged to be transported through said tube to said receiving station, said tube having a carrier stopping abutment to be selectively inserted in the path of the carrier, said carrier having a member to be ejected therefrom when the latter reaches the said receiving station, and means on the carrier adapted to engage said abutment for automatically ejecting said member from the carrier without removal of the carrier from the system.

2. In a pneumatic tube transport system, the combination of a pneumatic tube leading to a receiving station, at least one carrier arranged to be transported through said tube to said receiving station and having therein an ejectable member, an exit from said tube at said receiving station, means for selectively opening and closing said exit, means effective when said carrier arrives at said receiving station to cause said member to be automatically ejected from the carrier and through said exit without removal of said carrier from the system.

3. A pneumatic tube system according to claim 2 in which means are provided for releasing said carrier for further progress through the system after said insert has been automatically ejected from the carrier.

4. A pneumatic tube system according to claim 3 in which said member is releasably locked in said carrier until said carrier is stopped at said receiving station.

5. A pneumatic tube transport system, comprising in combination, a pneumatic tube leading to a receiving station, at least one carrier arranged to be transported through the system to said receiving station and carrying a member to be selectively released from the carrier at said station, selective means to stop said carrier at said station and including a shiftable abutment, an exit from said system at said receiving station, means to open said exit in timed relation to the operation of said abutment, and means automatically effective when said carrier strikes said abutment to cause said exit to be opened and also to cause said member to be ejected from the carrier through said exit and without removal of the carrier from the system.

6. A pneumatic tube system according to claim 5 in which an operating electromagnet is provided for operating said abutment, and another electromagnet is provided for controlling said exit, and means to interlock the portion of said electro magnets to maintain said abutment in the path of said carrier until said member has been ejected therefrom and through said exit.

7. A carrier for pneumatic tube systems and the like, comprising a casing arranged to receive a member to be transported with the carrier through the system, means to releasably lock said member in said casing, shiftable means carried by said carrier and effective in one position to lock said member in the carrier, and means effective upon the stopping of said carrier to operate said shiftable means to unlock said member to permit it to leave the carrier without removal of the carrier from the system.

8. A carrier for pneumatic tube systems and the like, comprising a casing arranged to receive a member to be transported with the carrier through the system, means to releasably lock the member within the carrier, shiftable abutment means on the carrier for controlling said locking means and arranged to unlock said member when said abutment strikes a corresponding shiftable abutment in the pneumatic tube.

9. A carrier according to claim 8 in which said locking means includes a spring which engages a shoulder on said member.

10. A carrier for pneumatic tube systems and the like, comprising a casing arranged to receive a member inside said carrier to be transported with the carrier through the system, said member having a pair of spaced shoulders, a leaf spring coupled to said casing for engaging said shoulders upon axial movement of said member into said carrier and effective in one position to lock said member within the carrier and effective in another position to unlock said member and to exert an ejecting force on said member.

11. A carrier for pneumatic tube systems and the like, comprising a casing arranged to receive a member inside said carrier to be transported with the carrier through the system, said member having means defining a locking notch, spring means coupled to said casing for flexibly engaging said notch to lock the member in the carrier upon axial movement of said member into said carrier, and means to operate said spring means relatively to said notch to unlock said member and to cause said spring means to exert an ejecting force on said member.

12. A carrier according to claim 11 in which said spring is a leaf spring having a bowed portion which registers with said notch to lock said member in the carrier.

References Cited in the file of this patent

UNITED STATES PATENTS

| | | |
|---|---|---|
| 683,022 | Cowley | Sept. 24, 1901 |
| 730,715 | Steinbock | June 9, 1903 |
| 867,225 | Brown | Sept. 24, 1907 |
| 1,732,242 | Needham | Oct. 22, 1929 |
| 2,251,238 | Busch | July 9, 1941 |
| 2,763,446 | Hanson | Sept. 18, 1956 |
| 2,912,066 | Ellithorpe | Nov. 10, 1959 |